United States Patent
Fahringer et al.

(10) Patent No.: US 9,382,855 B2
(45) Date of Patent: Jul. 5, 2016

(54) STATIONARY POWER PLANT

(75) Inventors: Albert Fahringer, Koessen (AT);
Johann Hirzinger, Koessen (AT);
Herbert Schaumberger, Muenster (AT);
Michael Waldhardt, Telfs (AT); Erich Kruckenhauser, Muenster (AT); Oscar Sarmiento, Innsbruck (AT)

(73) Assignee: GE JENBACHER GMBH & CO OHG, Jenbach (AT)

( * ) Notice: Subject to any disclaimer, the term of this patent is extended or adjusted under 35 U.S.C. 154(b) by 0 days.

(21) Appl. No.: 13/534,598

(22) Filed: Jun. 27, 2012

(65) Prior Publication Data
US 2012/0292921 A1 Nov. 22, 2012

Related U.S. Application Data

(63) Continuation of application No. PCT/AT2011/000022, filed on Jan. 17, 2011.

(30) Foreign Application Priority Data

Jan. 19, 2010 (AT) ................... A 62/2010

(51) Int. Cl.
*F02D 29/00* (2006.01)
*F02D 29/06* (2006.01)
(Continued)

(52) U.S. Cl.
CPC ............... *F02D 29/06* (2013.01); *F02D 17/00* (2013.01); *F02D 19/023* (2013.01); *F02D 31/001* (2013.01); *F02D 31/009* (2013.01); *F02D 41/0205* (2013.01); *F02P 5/1512* (2013.01); *H02P 9/04* (2013.01); *H02P 9/102* (2013.01);
(Continued)

(58) Field of Classification Search
CPC . F02D 41/04; F02D 41/1459; F02D 41/1498; F02D 41/08; F02D 41/06; F02D 41/18; F02D 2200/1012; F02D 2200/0414; F02D 2200/101; F02D 2200/0406; G01M 15/05; F02P 5/15
USPC .................. 123/333, 339.14, 339.15, 339.16, 123/339.18, 339.19; 290/40 R, 40 B, 40 C
See application file for complete search history.

(56) References Cited

U.S. PATENT DOCUMENTS 4,661,761 A * 4/1987 Katsumata ...................... 322/28
5,703,410 A * 12/1997 Maekawa .................... 290/40 C
(Continued)

FOREIGN PATENT DOCUMENTS

AT 413 132 11/2005
EP 1 492 222 12/2004
(Continued)

*Primary Examiner* — Hieu T Vo
*Assistant Examiner* — Sherman Manley
(74) *Attorney, Agent, or Firm* — Wenderoth, Lind & Ponack, L.L.P.

(57) ABSTRACT

The invention relates to a method for operating a stationary power plant, wherein a fuel/air mixture is burned in an internal combustion engine and wherein the internal combustion engine drives an alternating current generator, which is connected to an energy supply network and provides energy to the energy supply network, wherein if the actual rotational speed of the alternating current generator or of the internal combustion engine exceeds a predefinable maximum value due to a failure of the energy supply network, the combustion in the internal combustion engine is stopped at least partially, while the connection to the energy supply network is maintained.

20 Claims, 3 Drawing Sheets

(51) Int. Cl.
   *F02D 17/00* (2006.01)
   *F02D 31/00* (2006.01)
   *F02D 41/02* (2006.01)
   *F02P 5/15* (2006.01)
   *H02P 9/04* (2006.01)
   *H02P 9/10* (2006.01)
   *F02D 19/02* (2006.01)
   *F02D 41/00* (2006.01)
   *F02D 41/12* (2006.01)
   *F02M 21/02* (2006.01)

(52) U.S. Cl.
   CPC ........... *F02D 41/0097* (2013.01); *F02D 41/123* (2013.01); *F02D 2200/101* (2013.01); *F02M 21/0209* (2013.01); *Y02T 10/32* (2013.01); *Y02T 10/46* (2013.01)

(56) References Cited

U.S. PATENT DOCUMENTS

| | | | |
|---|---|---|---|
| 6,877,481 B2 * | 4/2005 | Fahringer et al. | 123/339.16 |
| 7,289,901 B2 * | 10/2007 | Kishibata et al. | 701/107 |
| 8,736,090 B2 | 5/2014 | Riihimäki | |
| 2003/0024503 A1 * | 2/2003 | Fahringer et al. | 123/339.16 |
| 2006/0103239 A1 * | 5/2006 | Kishibata et al. | 307/10.1 |
| 2006/0137651 A1 * | 6/2006 | Kishibata et al. | 123/352 |
| 2009/0134845 A1 * | 5/2009 | Czajkowski | 322/28 |

FOREIGN PATENT DOCUMENTS

| | | |
|---|---|---|
| EP | 1 281 851 | 2/2008 |
| WO | 2010/134994 | 11/2010 |

* cited by examiner

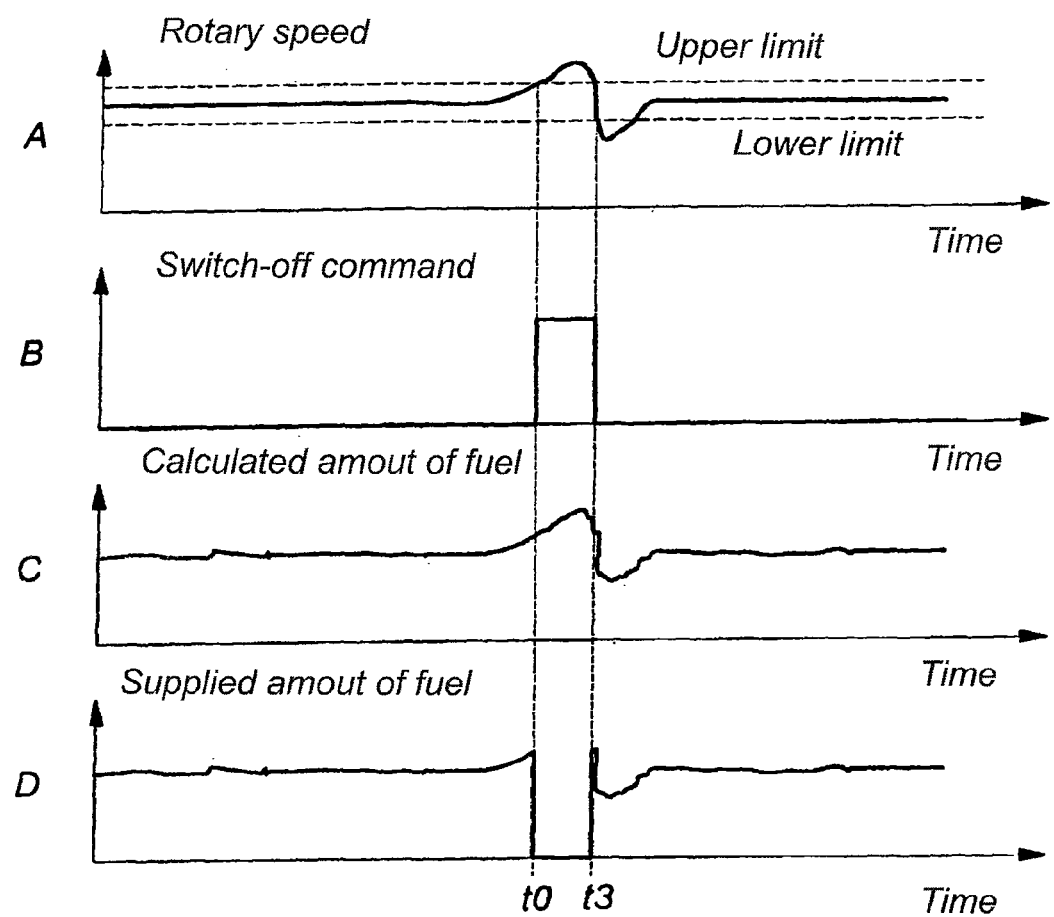

us 9,382,855 B2

STATIONARY POWER PLANT

This application is a Continuation of International Application No. PCT/AT2011/000022, filed Jan. 17, 2011, the entire disclosure of which is incorporated herein by reference.

BACKGROUND OF THE INVENTION

I. Field of the Invention

The invention concerns a method of operating a stationary power plant, wherein a fuel/air mixture is burned in an internal combustion engine and the internal combustion engine drives an alternating current generator, wherein the alternating current generator is connected to an energy supply network and delivers energy to the energy supply network.

The invention further concerns a stationary power plant including an internal combustion engine having at least one ignition device, and an alternating current generator which is operable by the internal combustion engine, wherein the alternating current generator in the operating condition is connected to an energy supply network and delivers energy to the energy supply network and the energy supply network predetermines the reference voltage and the reference frequency of the alternating current generator.

II. Description of the Related Art

Stationary power plants are frequently used in the so-called network parallel mode, in which case they feed energy into the power supply network (integrated grid network). Stationary power plants according to the invention include an internal combustion engine in which fuel is burnt in the presence of air and an alternating current generator driven by the internal combustion engine. In particular gas engines, that is to say internal combustion engines which are operated using the Otto cycle with a gaseous fuel are suitable for such stationary power plants as they have a high level of efficiency and low pollutant emissions. In the state of the art the energy supply network predetermines the reference voltage and the reference frequency of the alternating current generator. If there is a voltage drop in the energy supply network, that involves a cessation in that presetting of reference voltage and reference frequency, the consequence thereof being that the rotary speed of the internal combustion engine and as a further consequence also that of the alternating current generator rises rapidly by virtue of the removal of the resistance due to the energy supply network. Admittedly regulating concepts are certainly already known in which the increase in speed of the internal combustion engine is reduced by the fuel supply thereto being reduced, but the short-term increase in the speed of the internal combustion engine and the alternating current generator leads to a phase shift in the delivered ac voltage in comparison with the energy supply network. If the network failure is only in the short term and the energy supply network were then switched on again, that would involve a confrontation with a phase shift which self-evidently is undesirable. In practice therefore the procedure has changed over to interrupting the connection between the energy supply network and the alternating current generator and switching on the alternating current generator again, when the network is restored, only when phase coincidence prevails. Statutory presetting requirements are intended to prevent an interruption in the connection between the energy supply network and the alternating current generator.

SUMMARY OF THE INVENTION

Therefore the object of the present invention is to provide a method and a stationary power plant of the respective kind referred to in the opening part of this specification, in which the stated problems are alleviated.

In a method of the kind set forth in the opening part of this specification that object is attained in that when the actual rotary speed of the alternating current generator or the internal combustion engine exceeds a predefinable maximum value due to a failure of the energy supply network combustion in the internal combustion engine is at least partially stopped while the connection to the energy supply network is maintained. In the network, parallel mode the energy supply network predetermines the reference voltage and the reference frequency as well as the phase of the ac voltage of the alternating current generator.

In a stationary power plant of the general kind set forth in the opening part of this specification that object is attained by a regulating device which monitors the actual generator voltage and/or the actual generator frequency and/or the current of the alternating current generator, wherein upon a cessation of the generator voltage and/or a rise in the generator frequency above a predefinable limit value or at a rate above a predeterminable limit value and/or a rise in the generator current above a predeterminable limit value or at a speed above a predeterminable limit value the regulating device reduces the fuel supply to the internal combustion engine and/or stops at least one ignition device while the connection of the alternating current generator and the energy supply network remains maintained.

In that respect the term connection is used to mean the electrical connection between the energy supply network and the alternating current generator, with which energy is passed from the generator to the energy supply network.

An idea of the invention is that of reducing the combustion of the fuel/air mixture in the internal combustion engine by the amount of fuel which is fed thereto being reduced or even completely interrupted so that no unburnt mixture has to be passed through the internal combustion engine. In particular the method or the stationary power plant with regulating device provides that the internal combustion engine does not speed up upon network failure but continues to run without combustion or with partial or reduced combustion and in that situation also continues to drive the generator. The low inertia of internal combustion engine and alternating current generator means that, in the event of an only very short-term failure of the energy supply network or a drop in load, there is a large phase shift between the alternating current generator and the energy supply network. If the failure of the energy supply network should last for a prolonged period of time so that the actual rotary speed of the internal combustion engine drops below a predefinable reference value then combustion in the internal combustion engine can be taken up again or the combustion which is still occurring can be increased by fuel being fed to the engine again or by a corresponding ignition device being activated again. In that case the phase position of the alternating current generator is adjusted to the phase position of the energy supply network.

In an advantageous variant it can be provided in the method that the internal combustion engine has at least one combustion chamber in which the fuel-air mixture is burned, wherein the fuel supply to the at least one combustion chamber is interrupted.

It can further be provided that the internal combustion engine includes n combustion chambers and the fuel supply to m combustion chambers is interrupted, wherein m and n are natural numbers $\geq 1$ and $m \leq n$.

In a variant it can be provided that the internal combustion engine has at least one combustion chamber, wherein the fuel/air mixture is ignited with an ignition device, wherein at least one ignition device is deactivated.

In that respect it can further be provided that the internal combustion engine includes n combustion chambers and that the ignition device to m combustion chambers is deactivated, wherein m and n are natural numbers ≥1 and m≤n.

In regard to the stationary power plant it can be provided that the internal combustion engine includes n combustion chambers with a respective fuel supply, wherein the regulating device interrupts the fuel supply to m combustion chambers, wherein m and n are natural numbers ≥1 and m≤n.

It can further be provided that the internal combustion engine includes n combustion chambers with a respective ignition device, wherein the regulating device deactivates m ignition devices, wherein m and n are natural numbers ≥1 and m≤n.

Finally it can be provided that when the actual rotary speed of the alternating current generator falls below a predefinable reference value or upon a change in the rotary speed per unit of time above a predefinable limit value the regulating device increases the fuel supply and/or activates at least one ignition device.

BRIEF DESCRIPTION OF THE DRAWINGS

Further details and advantages of the invention are described with reference to the specific description and the accompanying Figures in which:

FIG. 3 shows the pattern in respect of time of a method according to the invention.

DETAILED DESCRIPTION OF THE INVENTION

Figure 1:
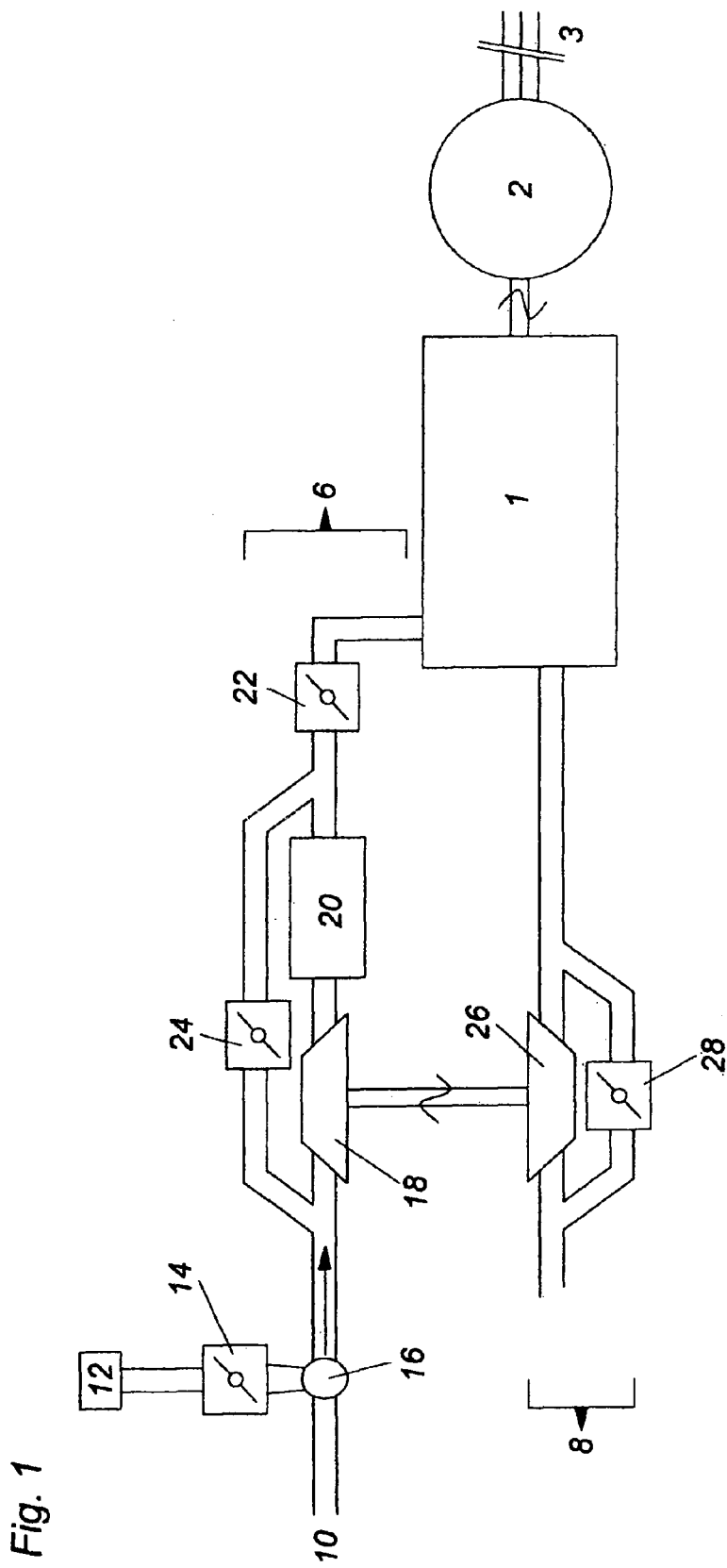
FIG. 1 shows a diagrammatic structure of a stationary power plant.

FIG. 1 diagrammatically shows the structure of a stationary power plant according to the invention. The stationary power plant is composed of an internal combustion engine 1 and an alternating current generator 2. The internal combustion engine 1 drives the alternating current generator 2 which in turn is connected to an energy supply network 3. The internal combustion engine 1 is a multi-cylinder gas engine which operates in the Otto-cycle mode of operation, that is to say with external ignition. The gas engine 1 has a plurality of combustion chambers (not shown), preferably in the form of stroke piston cylinders, in each of which a respective ignition device provides that the fuel/air mixture is burnt and the stroke piston performs work and in so doing drives the alternating current generator 2. The internal combustion engine 1 has an induction tract 6 and an exhaust tract 8. The induction tract 6 supplies the internal combustion engine 1 with air and fuel. For that purpose the induction tract has an air inlet 10 and is connected to a fuel source 12. The gaseous fuel (for example methane or other gases) is metered into the engine for example by way of a metering valve 14 and passed to a mixture forming device 16 into which the air feed 10 also opens. The fuel/air mixture formed in the mixture forming device 16 is then passed to a compressor 18 in which the fuel/air mixture is compressed. The compressed fuel/air mixture is thereafter cooled in a cooling device 20. The amount of fuel/air mixture fed into the combustion chamber of the internal combustion engine 1 can be controlled by way of a throttle device 22. The amount of fuel/air mixture can alternatively or additionally be regulated by way of a blow-by valve 24 in which a fuel/air mixture is recirculated, that is to say fed back again to upstream of the compressor 18.

Provided in the exhaust gas tract 8 is an exhaust gas turbine 26 driving the compressor 18 by way of a shaft. A bypass 28 can be provided for regulating the rotary speed of the exhaust gas turbocharger 26.

Figure 2:
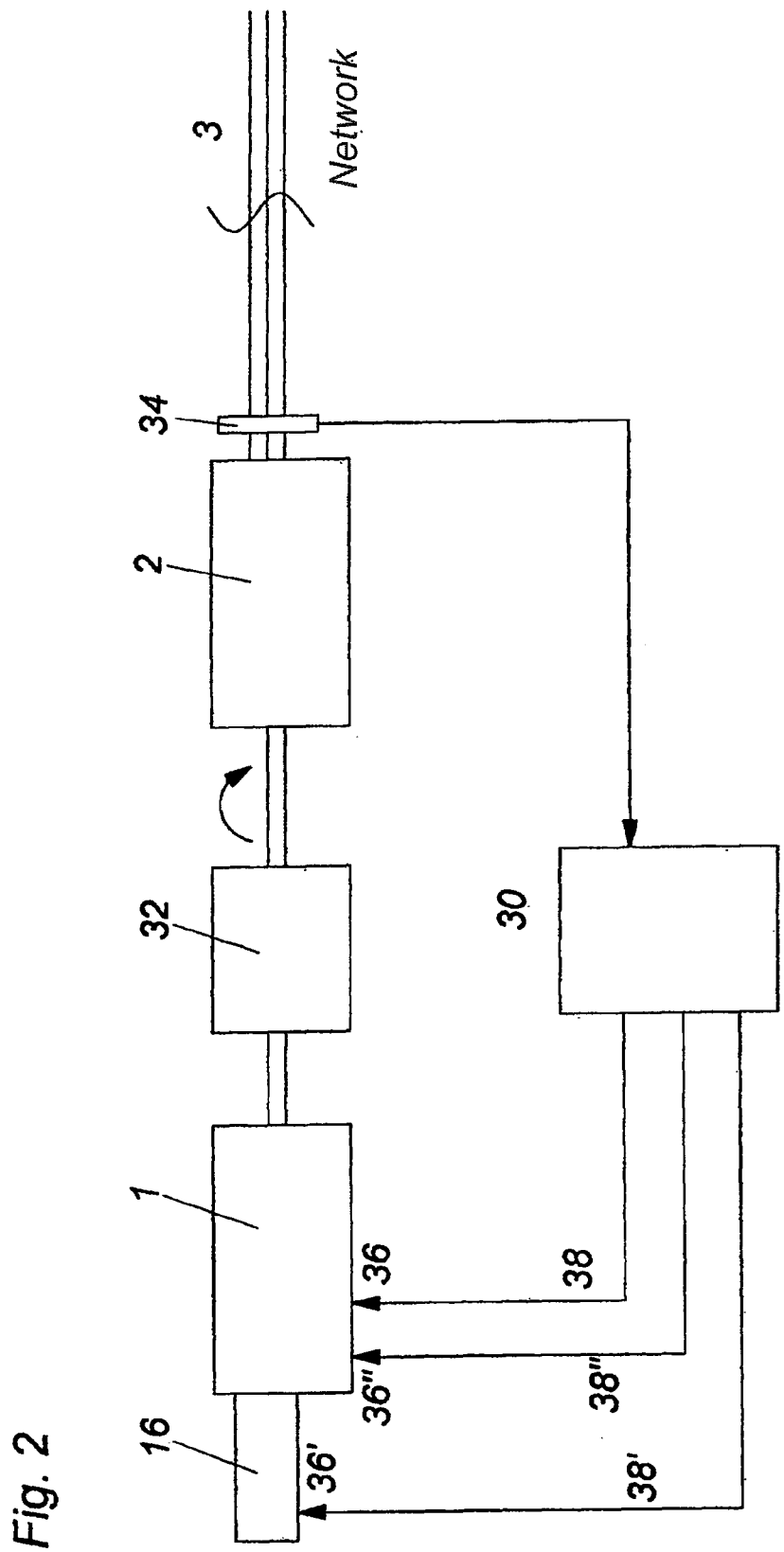
FIG. 2 shows a detail view of the power plant of FIG. 1.

FIG. 2 shows a block diagram of the stationary power plant of FIG. 1 in which regulation or the method are described in greater detail. The internal combustion engine 1 is connected by way of a coupling 32 to the alternating current generator 2 which feeds the energy supply network 3. In addition there are means (device) 34 for detecting voltage and frequency, possibly also the current of the energy supply network 3 (in general this involves per se known sensors) which are connected to a regulating device 30 and supply the corresponding measurement data. The predefined reference values are stored in the regulating device 30 and the actual values are compared to those reference values. In a deviation from the reference value, a regulating intervention is effected (see also the specific description relating to FIGS. 3 and 4) at the internal combustion engine 1 by way of the connections 38, 38', 38". Provided on the internal combustion engine 1 are actuators 36, 36', 36" at which the regulating interventions take place if for example there is a deviation from the reference voltage and/or reference frequency and/or generator current. For that purpose on the one hand the amount of fuel gas can be regulated for example by way of actuators 36, 36', 36" like the gas metering valve 14, the throttle device 22, the blow-by valve 24 or the bypass 28, or on the other hand one or more ignition devices can be activated or deactivated respectively.

FIG. 3 diagrammatically shows individual states as a function of time for the method according to the invention. Diagram A shows the rotary speed of the internal combustion engine 1 as a function of time t. As the rotary speed n of the internal combustion engine 1 is a measurement in respect of the rotary speed of the alternating current generator 2 that value can be put to use. Equally however it would also be possible to use the rotary speed of the alternating current generator 2. It will be seen that the rotary speed of the internal combustion engine 1 is substantially constant to just before the moment t0, which points to a constant state of the energy supply network 3. Then a network drop or a load decrease can be observed, which leads to the rotary speed of the internal combustion engine 1 suddenly rising. When an upper rotary speed limit is reached at the moment t0 a switch-off command is passed to all ignition devices or the gas quantity feed by way of the regulating device 30. The engine rotary speed still briefly rises. Then the rotary speed drops, in which case when a lower limit is reached at the moment t3 the regulating device sets the internal combustion engine in operation again by the fuel feed or the ignition devices being activated. The duration of the switch-off command is shown in diagram B.

Diagram C shows the calculated amount of fuel while diagram D shows the amount of fuel which is actually supplied. The calculated and supplied amounts are identical until moment t0. Due to the fuel supply being shut down at the moment t0, the calculated amount of gas is derived from the rotary speed of the internal combustion engine while however no fuel is actually supplied thereto. After restoration of the fuel supply (and activation of the ignition devices) the calculated and the metered amounts of gas are coincident again.

The invention therefore substantially concerns a regulating concept for an internal combustion engine, preferably in the form of a gas engine having a plurality of cylinders, driving an alternating current generator. In that case rotary speed regulation of the internal combustion engine is effected by gas metering, cylinder-selective ignition and positioning of the control members after a load decrease which can be caused by the normal mode of operation of the engine or after a network failure. After detection of a load decrease the control members are so positioned that a rapid reduction in the boost charge pressure is achieved. In addition the amount of gas is so metered and the cylinder ignition sequence is so controlled that no combustion takes place in the cylinder. The load decrease is identified by a relationship between the parameters available to the internal combustion engine and intermediate parameters calculated by the control system. A rapid reduction in the boost charge pressure is possible by the specifically targeted positioning of the control members without the risk of compressor surge, i.e. hitting the pump limit of the compressor device, which can lead to an unstable mode of operation of the internal combustion engine.

An advantage with this method is that during the braking phase no unburnt mixture can pass through the internal combustion engine and into the exhaust tract and no side-effects occur (unwanted late-ignition phenomena, detonation). In addition this approach permits the best possible braking action due to the brief deactivation of combustion in all cylinders.

Detection of a network failure (NF) is effected by fulfilling a criterion which arises out of a logic relationship between four variables: voltage $U_t$, current $I_t$, frequency variation $$\frac{df}{dt}$$

and polar wheel angle $\delta$:

$$NF = f\left(U_t, I_t, \frac{df}{dt}, \delta\right). \quad (1)$$

If the frequency variation is not present because of a complete failure of the energy supply network it is replaced by an equivalent characteristic value x, wherein the criterion for the detection of a load decrease remains unchanged.

$$NF_{mod} = f(U_t, I_t, x, \delta). \quad (2)$$

Optionally it would also be possible to use dI/dt or dU/dt as the triggering criterion.

When a network failure is detected the NF algorithm will deliver a logic signal 'True' (1).

On the basis of reactive and active power as well as line voltage the current at the generator terminal $I_t$ and the phase angle $\phi$ is calculated in accordance with equations (3) and (4):

$$I_t = \frac{\sqrt{P_t^2 + Q_t^2}}{U_t} \quad (3)$$

$$\phi = \cos^{-1}\left(\frac{P_t}{U_t I_t}\right) \quad (4)$$

The polar wheel angle can be computed in the steady generator mode by the generator characteristics:

$$\delta \approx \tan^{-1}\left(\frac{X_q I_t \cos\phi}{U_t + X_q I_t \sin\phi}\right) \quad (5)$$

For optimum regulation it can be provided, for the method and the stationary power plant, that the total of phase position and polar wheel angle is kept within +/−180°, which thus represents the regulating value. Ideally, it is to be regulated until the energy supply network is restored to a value which prevailed prior to the fault or failure.

In accordance with that procedure, for the respective operating point of the gas engine, the amount of gas that is currently needed is calculated in accordance with the following formula and meteredly fed at a central location:

$$Q_{gas} = f(\eta_{vol}, T'_2, p'_2, n, L_{min}, \lambda) \quad (6)$$

wherein $Q_{GAS}$ is the amount of gas, $\eta_{vol}$ is the volumetric efficiency, n is the engine speed, $T'_2$ is the mixture temperature, $p'_2$ is the boost charge pressure, $L_{MIN}$ is the minimum air requirement (stoichiometric, gas characteristic value) and $\lambda$ is the air ratio (excess of air in relation to stoichiometric combustion).

By virtue of the gas metering action by a gas metering valve there is now the possibility of primarily metering the amount of gas rapidly in accordance with the foregoing relationship. In addition, it is only due to the use of that fast valve that there is the possibility of also sufficiently rapidly completely throttling the amount of gas separately from the foregoing formalism and thereby completely preventing combustion in the internal combustion engine. An advantage there is that calculation of the amount of gas can be steadily pursued in the background for the current working point, but is not passed to the gas metering valve for a certain time, thereby no combustion occurs and thus a braking action can be afforded. Such a braking action can be necessary for the load decrease at the gas engine and a corresponding increase in rotary speed.

When the internal combustion engine reaches a desired operating point again, at which the braking action is no longer required, the metered gas feed can be switched on again directly to the gas metering valve. It is thus possible to go from the state 'braking action—no combustion' to the state 'standard mode of operation—combustion' directly or in steps.

With reference to FIG. 3 the criterion 0:engine speed≥upper limit occurs at the time t0 and the switch-off command is generated until the attainment of criterion 3: rotary speed≤lower limit at the time t1. Thus the gas supply is set to the value 0 for the period of time [t0, t3].

Here however in addition staggered throttling of the amount of gas of individual cylinders or groups of cylinders can be effected in dependence on staggered limit values (criteria). In dependence on the order of magnitude of exceeding the limit value the gas supply to a plurality of to up to all cylinders or groups of cylinders is successively completely throttled, thereby permitting a staggered braking action.

Moment t0—criterion 0: engine speed≥upper limit 0→switch-off command cylinder group 0

Moment t1—criterion 1: engine speed≥upper limit 1→switch-off command cylinder group 1 and so forth.

Reactivation of the switched-off cylinders or groups of cylinders is also effected in staggered fashion.

Moment t2—criterion 2: engine speed≤lower limit 1→restoration command cylinder group 1

Moment t3—criterion 3: engine speed≤lower limit 0→restoration command cylinder group 0 and so forth.

A somewhat more complicated and expensive logic is required for deactivating and reactivating the corresponding cylinders or cylinder groups. That however also permits further combinations for example of staggered deactivation of the cylinders or cylinder groups and unitary reactivation of all cylinders after the value falls below an established limit value.

A cylinder group is any, technically meaningful grouping of a plurality of cylinders, for example four cylinders.

The invention claimed is:

1. A method of operating a stationary power plant, comprising
   burning a fuel/air mixture in an internal combustion engine;
   using the internal combustion engine to drive an alternating current generator that is connected to an energy supply network in network parallel mode, the energy supply network having predetermined a reference voltage and a reference frequency of the generator, and providing energy to the energy supply network;
   detecting a network failure by using a detecting device that includes sensors that are connected to the energy supply network and that detect at least the voltage and frequency of the energy supply network and a regulating device, the detecting device being connected to the regulating device, and by the regulating device comparing the voltage and frequency of the energy supply network detected by the detecting device with the reference voltage and the reference frequency; and
   monitoring a parameter the internal combustion engine or the generator with the regulating device and, when both a network failure is detected and the monitored parameter exceeds a predefined maximum value, at least partially stopping combustion in the internal combustion engine while keeping the alternating current generator connected to the energy supply network.

2. The method of claim 1, wherein said burning comprises burning the fuel/air mixture in an internal combustion engine having at least one combustion chamber in which the fuel-air mixture is burned and said at least partially stopping comprises interrupting the fuel supply to the at least one combustion chamber.

3. The method of claim 2, wherein the internal combustion engine includes n combustion chambers and said interrupting comprises interrupting the fuel supply to m combustion chambers, wherein m and n are natural numbers ≥1 and m≤n.

4. The method of claim 1, wherein said burning comprises burning the fuel/air mixture in an internal combustion engine having at least one combustion chamber by igniting the fuel/air mixture with an ignition device, and wherein said at least partially stopping comprises deactivating the ignition device.

5. The method of claim 4, wherein the internal combustion engine includes n combustion chambers and said interrupting comprises interrupting the fuel supply to m combustion chambers, wherein m and n are natural numbers ≥1 and m≤n.

6. The method of claim 1, and further comprising at least partially increasing the amount of fuel burned in the internal combustion engine after the actual rotary speed of the alternating current generator falls below a predetermined reference value or if the actual rotary speed of the alternating current generator falls at a rate greater than a predetermined maximum value.

7. A stationary power plant, comprising
   an internal combustion engine for burning a fuel/air mixture, said internal combustion engine having at least one ignition device;
   an alternating current generator that is operable by said internal combustion engine and that is connected to an energy supply network in network parallel mode to deliver energy to the energy supply network, the energy supply network having a predetermined reference voltage and reference frequency;
   a detecting device that includes sensors that are connected to the energy supply network and that detect at least the voltage and frequency of the energy supply network;
   a regulating device that is connected to the detecting device and that is configured to:
      detect a network failure by comparing the voltage and frequency of the energy supply network detected by the detecting device with the reference voltage and the reference frequency,
      monitor a parameter of the internal combustion engine or the generator, said parameter selected from the group consisting of an actual generator voltage, an actual generator frequency and a current of the alternating current generator, and
      when both a network failure is detected and the monitored parameter includes at least one of a cessation of the generator voltage, a rise in the generator frequency above a predefined maximum value or at a rate above a predetermined limit value, and a rise in the generator current above a predetermined limit value or at a speed above a predetermined limit value, at least partially stop combustion in the internal combustion engine by reducing fuel supply to the internal combustion engine or stopping at least one ignition device while keeping the alternating current generator connected to the energy supply network.

8. The stationary power plant of claim 7, wherein the internal combustion engine includes n combustion chambers and said regulating device is configured to interrupt the fuel supply to m combustion chambers, wherein m and n are natural numbers ≥1 and m≤n.

9. The stationary power plant of claim 7, wherein the internal combustion engine includes n combustion chambers each having a respective said ignition device and said regulating device is configured to deactivate m ignition devices, wherein m and n are natural numbers >=1 and m<=n.

10. The stationary power plant as set forth in claim 7, wherein said regulating device is further configured to increase the fuel supply or activate at least one ignition device in response to the actual rotary speed of the alternating current generator falling below a predetermined reference value or in response to a change in the rotary speed per unit time above a predetermined limit value.

11. The stationary power plant as set forth in claim 7, wherein said regulating device is further configured to increase the fuel supply and activate at least one ignition device in response to the actual rotary speed of the alternating current generator falling below a predetermined reference value or in response to a change in the rotary speed per unit time above a predetermined limit value.

12. The stationary power plant of claim 7, and further comprising a coupling connecting said internal combustion engine to said alternating current generator.

13. The stationary power plant as set forth in claim 7, wherein said regulating device is configured to pass a switch-off command to all ignition devices.

14. A stationary power plant, comprising:
   an internal combustion engine for burning a fuel/air mixture, said internal combustion engine having at least one ignition device;
   an alternating current generator that is operable by said internal combustion engine and that is connected to an energy supply network in network parallel mode to deliver energy to the energy supply network, the energy supply network having a predetermined reference voltage and reference frequency;

a detecting device that includes sensors that are connected to the energy supply network and that detect at least the voltage and frequency of the energy supply network;

a regulating device that is connected to the detecting device and that is configured to:

detect a network failure by comparing the voltage and frequency of the energy supply network detected by the detecting device with the reference voltage and the reference frequency, monitor a parameter of the internal combustion engine or the generator, said parameter selected from the group consisting of an actual generator voltage, an actual generator frequency and a current of the alternating current generator, and when both a network failure is detected and the monitored parameter includes at least one of a cessation of the generator voltage, a rise in the generator frequency above a predefined maximum value or at a rate above a predetermined limit value, and a rise in the generator current above a predetermined limit value or at a speed above a predetermined limit value, at least partially stop combustion in the internal combustion engine by reducing fuel supply to the internal combustion engine and stopping at least one ignition device while keeping the alternating current generator connected to the energy supply network.

15. The stationary power plant of claim 14, wherein the internal combustion engine includes n combustion chambers and said regulating device is configured to interrupt the fuel supply to m combustion chambers, wherein m and n are natural numbers ≥1 and m≤n.

16. The stationary power plant of claim 14, wherein the internal combustion engine includes n combustion chambers each having a respective said ignition device and said regulating device is configured to deactivate m ignition devices, wherein m and n are natural numbers ≥1 and m≤n.

17. The stationary power plant as set forth in claim 14, wherein said regulating device is further configured to increase the fuel supply or activate at least one ignition device in response to the actual rotary speed of the alternating current generator falling below a predetermined reference value or in response to a change in the rotary speed per unit time above a predetermined limit value.

18. The stationary power plant as set forth in claim 14, wherein said regulating device is further configured to increase the fuel supply and activate at least one ignition device in response to the actual rotary speed of the alternating current generator falling below a predetermined reference value or in response to a change in the rotary speed per unit time above a predetermined limit value.

19. A method of operating a stationary power plant, comprising:

burning a fuel and air mixture in an internal combustion engine;

driving an alternating current generator that is connected to an energy supply network with the internal combustion engine so as to supply provide energy to the energy supply network;

detecting a failure of the energy supply network using a detecting device that includes sensors that are connected to the energy supply network and that detect at least the voltage and frequency of the energy supply network by comparing the voltage and frequency of the energy supply network detected by the detecting device with a predetermined reference voltage and reference frequency;

at least partially stopping said burning of the fuel and air mixture in the internal combustion engine while maintaining connection of the alternating current generator to the energy supply network in response to actual rotary speed of the alternating current generator or the internal combustion engine exceeding a predetermined maximum value due to the failure of the energy supply network; and after detecting a failure of the energy supply network, decreasing boost charge pressure of the internal combustion engine so as to cause rapid reduction in boost charge pressure and avoid compressor surge of the internal combustion engine.

20. The method of operating a stationary power plant of claim 1, and further comprising:

after detecting a network failure, decreasing boost charge pressure of the internal combustion engine by control members, operable to decrease boost charge pressure of the internal combustion engine, that are positioned so as to cause rapid reduction in boost charge pressure and avoid compressor surge of the internal combustion engine.

* * * * *